United States Patent [19]

Holcblat et al.

[11] Patent Number: 4,648,354

[45] Date of Patent: Mar. 10, 1987

[54] STEAM GENERATING APPARATUS HAVING A FEEDWATER HEADER

[75] Inventors: Alain H. Holcblat, Issy les Moulineaux; Patrick Sundheimer, St Naur des Fosses; Yves Pascal, Nanterre, all of France

[73] Assignee: Framatome, Courbevoie, France

[21] Appl. No.: 881,306

[22] Filed: Jul. 2, 1986

[30] Foreign Application Priority Data

Jul. 2, 1985 [FR] France .............................. 85 10086
Jan. 29, 1986 [FR] France .............................. 86 01259

[51] Int. Cl.4 .............................................. F22B 1/02
[52] U.S. Cl. ........................................ 122/32; 122/34; 122/412; 122/438
[58] Field of Search ................... 122/235 D, 412, 436, 122/438, 451 R, 32, 501, 34

[56] References Cited

U.S. PATENT DOCUMENTS

| 1,940,070 | 12/1933 | Barry et al. | 122/501 |
| 4,404,929 | 9/1983 | Brand et al. | 122/412 |
| 4,462,340 | 7/1984 | Mayer et al. | 122/34 |
| 4,577,593 | 3/1986 | Teigen | 122/235 D |
| 4,579,088 | 4/1986 | Kim, Jr. et al. | 122/34 |

*Primary Examiner*—Edward G. Favors
*Attorney, Agent, or Firm*—Pollock, Vande Sande & Priddy

[57] ABSTRACT

A steam generator has a pressure vessel containing a stack of exchange tubes and a feedwater header of ring shape connected to a feed water intake pipe passing through the wall of the vessel. A horitzontal section of the pipe contains at least one deflector comprising an axial hub and several helical blades connecting the hub to the wall of the pipe. The blades have a length which represents at least half a winding pitch if the deflector is to counteract thermal stratification only, at least 1.5 winding pitch if for avoiding pressure surges.

11 Claims, 16 Drawing Figures

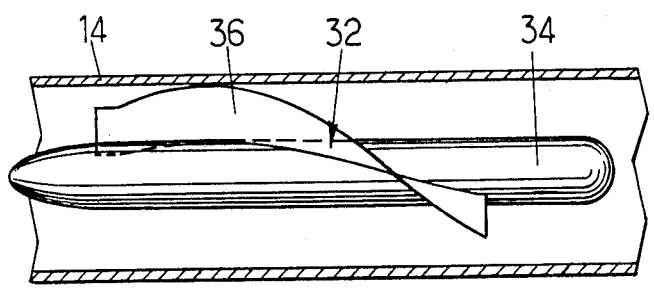
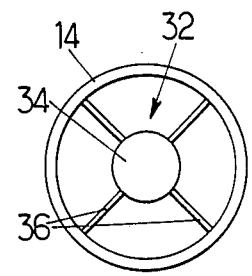
FIG.5.  FIG.6.
FIG.9  FIG.7.
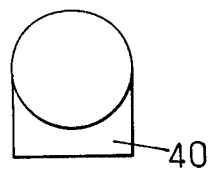 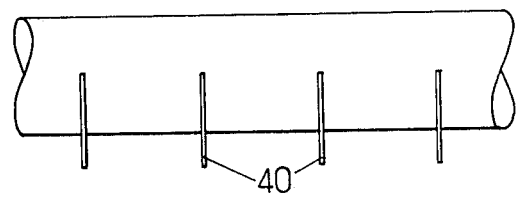
FIG.10  FIG.8.
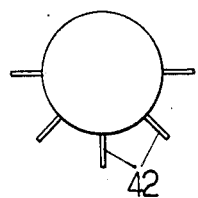 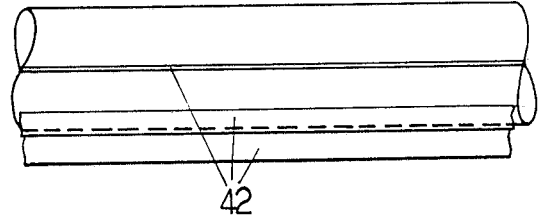

STEAM GENERATING APPARATUS HAVING A FEEDWATER HEADER

BACKGROUND OF THE INVENTION

1. Field of the Invention

The invention relates to steam generators of the type comprising a pressure vessel containing a stack of heat exchange elongated elements and whose upper part forms a steam plenum and a feedwater header located in the vessel above the heat exchange elements, generally of toric ring shape, connected to a feed water intake pipe passing through the wall of the vessel and having nozzles for distributing the flow of feed water into the vessel. It is particularly suitable for use in nuclear power stations and more especially in power stations using a water cooled and moderated reactor.

2. Prior Art

The steam generators of PWRs frequently comprise a feedwater header, whose shape approximates that of a toric ring, fed by a substantially horizontal pipe section. During normal operation of the reactor, the free surface of water in the vessel is above the pipe and the ring and the speed of the water in the pipe is relatively high. Operation is then satisfactory. But it may be disturbed under different temporary exceptional conditions.

In particular, different transitory operating phases lead to the appearance of pressure surges causing harmful overpressures. This occurs when the water level in the steam generator (for example in the case of shut down at high temperature) drops below the level of the feed water pipe. The header is then unflooded. If this situation lasts, the header and the pipe empty and fill up with saturated steam. When power operation is resumed, under-saturated water is fed through the duct: it causes sudden condensation of the steam, so a depression then the formation of a pressure wave which travels towards the pipe in the form of a pressure surge.

Attempts have already been made to overcome this problem by preventing the header and/or the pipe from emptying. For that, the conventional distribution holes provided at the lower part of the distributor have been replaced by J-shaped discharge tubes connected to the upper part of the distributor (French Pat. No. 2 333 200 and U.S. Pat. No. 4,502,419). This arrangement solves the problem, but it is complex and difficult to use as a retrofit in existing steam generators.

Another source of cracks is thermal stratification of the feed water during low pressure operation. This phenomenon is described in the article "Loading conditions in horizontal feed water pipes of LWRs influenced by thermal shock and thermal stratification effects", by M. Miksch et al, NUCLEAR ENGINEERING AND DESIGN, 84 (1985), 179–187. This phenomenon is more acute in steam generators having a preheated water supply used for normal operation and a cold water supply used under abnormal situations and at low pressure. In the later situation, a low cold water feed supply flow is injected into the pipe which is full of water at the operating temperature of the stream generator. Since the flow speed is low, the cold feed water does not mix with hot water present in the pipe, but forms a distinct layer at the lower portion of the pipe. Stratification maintains a high temperature gradient between the lower part and the upper part of the wall of the pipe, which generates thermal stresses likely to cause cracking, including in the weld connecting the pipe to the enclosure. This phenomenon is further aggravated by the fatigue induced by the oscillations of the separating layer.

The J-shaped tubes used for attenuating the hammering phenomenon do not appreciably reduce this second phenomenon, suggesting that it is maintained by the heat exchange due to natural convection between the hot water in the vessel and the inside of the pipe. Attempts have been made to overcome this second problem. One consists in injecting feed water into the pipe through a ring weir opening into a water box where mixing occurs to a limited extent. It has also been proposed to provide, on the internal face of a bend of the pipe an annular or spiral weir of small height for increasing the turbulence of the flow. Such a device has only a low efficiency: when the flow is small, i.e. when mixing is desired, the steam of cold feed water just jumps over the obstacle.

Similar problems exist in the BWRs, where the feedwater header is located within the pressure vessel of the water, with similar consequences.

SUMMARY OF THE INVENTION

It is an object of the invention to overcome the above problems. It is a more specific object to attenuate the pressure surge and/or thermal stratification problems, while using only simple and purely static means, only causing a small head loss and with which an existing stream generator may be equipped without major difficulties.

With that purpose in mind, there is provided a steam generating apparatus of the above-defined type, wherein a horizontal portion of the pipe close to the header contains at least one deflector comprising an axial hub and a plurality of helical blades connecting the hub to the wall of the duct and whose length corresponds to at least one half a turn.

It may be noted that the use of deflectors in the form of twisted tapes (U.S. Pat. No. 1,672,617 to Lasker; U.S. Pat. No. 1,887,130 to Hobbs) and of helical deflectors (German Pat. No. 123 537) within individual tubes of a heat exchanger has been known for a long time, however for purposes quite different of those of the invention and not in a feedwater header.

When it is only desired to avoid emptying of the pipe in the case of unflooding of the header, it is sufficient to provide a single helical deflector having an axial hub, placed between the header and the location where the pipe passes through the vessel or just upstream thereof. The blades will have a length and a pitch such that the lowest point in the highest section of each interblade channel is at a level higher than the highest point of the lowest section of the same channel. Six blades may be advantageously provided each having an angular extent about the axis between one turn and one turn and a half.

When it is also desired to achieve mixing for avoiding thermal stratification, a second deflector may be provided, in the portion of the pipe which is outside the enclosure. The second deflector, placed upstream of the vessel, may comprise blades whose angular extent is of a half a turn at least. It may have four blades distributed evenly about the axis. The two deflectors will then advantageously have blades of the same pitch.

In a modified embodiment, the two deflectors may be combined and mounted on a same hub. In all cases, the front portion of a single deflector or of that one of the deflectors which is upstream will preferably be axially directed so as to impart only progressively a corkscrew movement on the flow.

In practice, the blades will typically have a winding pitch between two and five times the diameter of the duct, and, the hub will typically have a diameter between 0.25 and 0.5 times the diameter of the duct.

In a specific embodiment, a second set of helical blades or vanes is radially located between the first plurality of blades and the pipe wall (or the first plurality of blades and the hub). If only for countering thermal stratifications, the two sets will typically have opposite winding directions. If for reducing pressure surges, the blades may have the same winding direction.

The hub may have a cross section which increases in the direction of feedwater flow. That construction improves mixing since the lower water layer is then lifted to a level close to the higher portion of the pipe with an acceptable head loss. A conical or bullet shape will typically be used.

The invention will be better understood from the following description of particular embodiments given by way of examples. The description refers to the accompanying drawings.

BREF DESCRIPTION OF THE DRAWINGS

FIG. 1 is a schematical plan view of the feed water header of a stream generator for use in a PWR plant and of its feed pipe, having means in accordance with a first embodiment of the invention, FIG. 2 is an elevational view of one of the deflectors mounted in the pipe of FIG. 1, one blade only being shown, FIG. 3 is a left hand view of the deflector of FIG. 2, FIG. 4 is a diagram showing the siphon equivalent to one of the interblade channels of the deflector of FIG. 2, FIGS. 5 and 6, similar to FIGS. 2 and 3, show the second deflector equipping the pipe shown in FIG. 1, FIGS. 7 and 8 are general diagrams showing feed water pipe sections provided with heat exchange fins for countering thermal stratification, FIGS. 9 and 10 are right hand views of FIGS. 7 and 8, respectively, FIG. 11, similar to FIG. 1, is an illustration of a steam generator and feedwater pipe provided with means according to another embodiment, FIG. 12 is a isometric front view of part of a feedwater pipe containing another deflector according to the invention for use in the arrangement of FIG. 11, FIG. 13 is an axial cross section of the deflector of FIG. 12, FIGS. 14 and 15 are vertical and radial cross sections of a deflector according to another embodiment, and FIG. 16 is a schematic representation of a BWR provided with deflector means according to the invention.

DETAILED DESCRIPTION OF THE PREFERRED EMBODIMENTS

Figure 1:
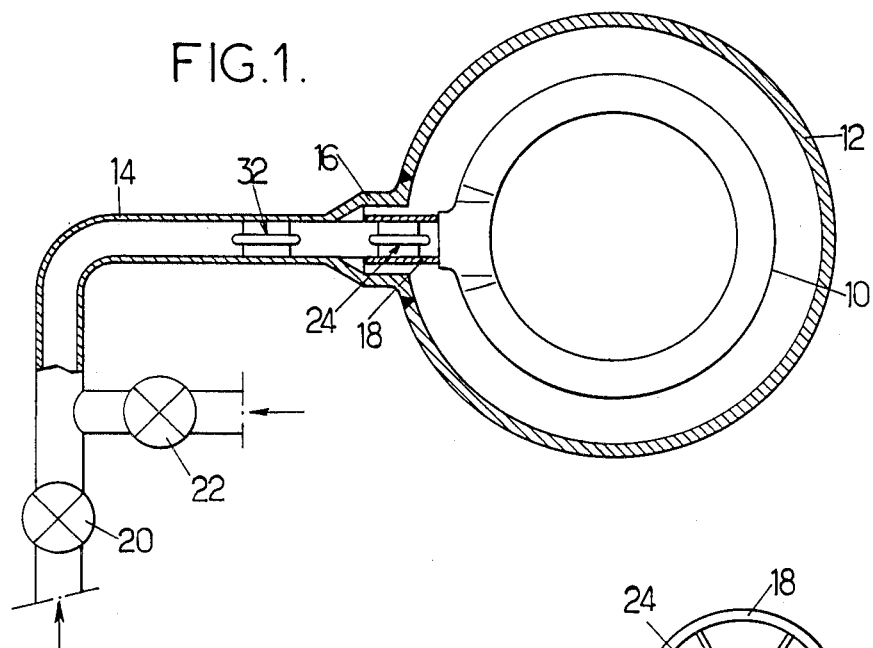
Figure 3:
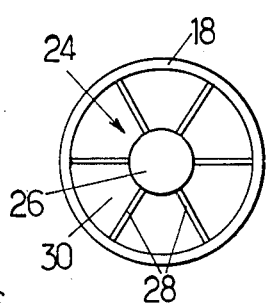
Figure 2:
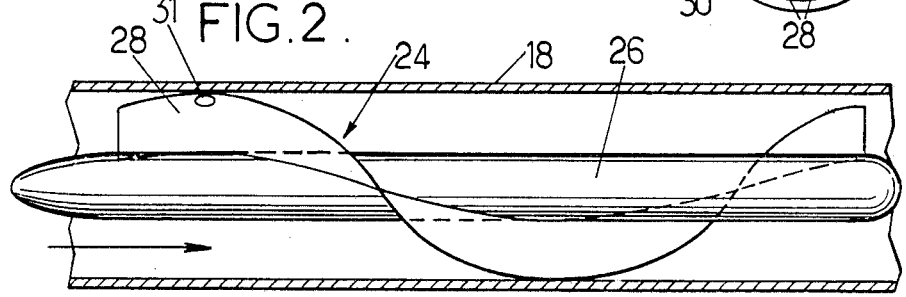

Referring to FIG. 1, there is shown a feedwater header and a supply pipe of a type currently used in the steam generators of PWR power plants. A more complete description of such generators may be found in French Pat. Nos. 2 333 200 or 4 502 419 (Smith, Jr.) to which reference may be had. The header is in the shape of a ring which, as illustrated, has a full rotational symmetry. But a lobed shape would also be possible. This header is placed in the top part of a pressure vessel 12, coaxially therewith. Feed water flows from the header into the vessel through evenly distributed distributed passages or nozzles, which may be either simple apertures or J-shaped tubes. The pipe 14 bringing feed water to the header 10 has a straight horizontal part fixed to a sleeve 16 projecting through casing 12. It is extended by a section 18 for connection with the header 10, forming a T union.

Pipe 14 is provided with a main water supply, with a cut off valve 20, which receives preheated water and with a duct for supplying emergency water, also having a valve 20 which is closed in normal operation.

As shown in FIG. 1, the exchanger comprises a first deflector 24 placed in the section 18 and whose function is to prevent the pipe from emptying should the supply be interrupted. To this end, deflector 24 comprises a hub 26 and a plurality of evenly spaced apart blades 28 wound about the hub. Each blade 28 has a front helical part and a rear part whose plane tangent to the trailing edge is parallel to the axis for directing the outlet flow axially. The blades are at least four in number (six in the embodiment shown). Each blade is helical with a constant pitch, except in the trailing end part.

Figure 4:
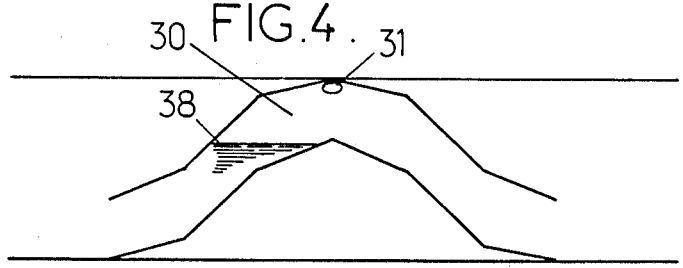

The lowest point of the highest part of each interblade channel, such as channel 30 shown schematically in FIG. 4, should be substantially above the highest point of the lowest cross-section of the same channel, which means that the ratio between the length of each blade and the pitch should be high enough. In practice, a length of from one pitch and one pitch and a half will be satisfactory. So that the siphon formed by the helix may unprime, communication means are provided between the helical streams defined by at least that of the blades which passes at the top of the pipe between the ends. As illustrated, these means are formed by a hole 31 at the top part of a blade 28, where it passes at the top point of the duct. If and when the level drops after it has reached the upper generatrix of the hub, the unpriming hole 31 balances the vapor pressures upstream and downstream of the blade. The water level in the upper part of the interblade channel, limited by the blade 28 which is formed with the hole, drops at the same time as the downstream level. As soon as this latter reaches the hub, the levels stabilize until and unless there is complete emptying of the pipe downstream of the deflector.

The pressure loss imparted by deflector 24 is an increasing function of the slant of the blades with respect to the axis of the duct. On the other hand, the longitudinal space required for the deflector is all the greater tha longer the pitch. The number of turns required depends on the number of blades. A compromise will consequently be adopted, consisting in adopting the smallest possible slant and the minimum number of blades compatible with the available length.

The heat exchanger shown in FIG. 1 further comprises a second deflector 32, placed upstream of the first, in the pipe section 14 which is outside vessel 12. The second deflector is for water mixing and for countering thermal stratification. The deflector 32 comprises a hub 34 having the same diameter as hub 26, and several blades (four in the embodiment illustrated) connecting the hub to the wall of pipe 14. Each blade 36 has a helical rear part which may have a trailing lip set advantageously to the same pitch as blades 28, and a front part for setting the flow in rotation, whose plane tangent to the leading edge is parallel to the axis. Thus pipe 14 is divided into four independent interblade channels. Each blade may have a length corresponding to half a turn or more.

In the case where deflector 32 is omitted, the blades 28 may comprise a front portion for progressively setting the flow in rotation.

The role of deflector 32 (when the pipe is fed with water formed of two parts having different densities or when water is injected via the pipe which has a density different from that of the water which filled it before), is immediately apparent : when the flow of high density water is at a low rate, a stratified flow tends to form. Each blade 28 causes a half turn rotation, which brings the heavier component (lower layer) to the top part of the pipe and conversely. The original order of the layers is therefore reversed at the outlet of deflector 32, which causes mixing by mutual diffusion.

The purpose of deflector 24 is to prevent the pipe from emptying through the header should there be an interruption of water supply. For a suitable hub size and a sufficiently short pitch of the blades, the lower point of the upper cross-section of each interblade channel is above the top point of the lower cross-section, as can be seen in FIG. 4. Consequently, each interblade channel, which makes at least one complete turn, forms a siphon. In each channel, the free surface 38 establishes at the level of or above the axis of the hub and a water "plug" exists at the lower part and prevents steam from passing: the pipe cannot become dry.

It would be possible to use, instead of two separate deflectors, a single deflector of sufficient length whose blades have at least 1.5 turn.

The deflector means which have just been described can easily be inserted into an existing exchanger. Deflector 32 may be fitted by unwelding a section of pipe 14 and then welding it again, after insertion of the deflector, without need for access to the inside of the steam generator. Deflector 24 may be inserted from the outside, for example by providing it with a liner which is slid through sleeve 16.

Whatever the embodiment, the deflector 24 reduces the violence of pressure surges caused by injection of cold water and protects pipe 14 from persistent stratification due to arrival of hot water flowing from the vessel or to heat exchange by natural convection between the water (or the steam in the plenum) and the feed water. Deflector 24 counters natural convection in the vicinity of the pipe and stops the propagation of thermal oscillations at the interface between the cold layer and the hot layer.

It can be seen that a purely static device of streamlined stage has been provided, having a long lifespan and imparting only a small pressure drop to the flow under normal operating conditions.

Stratification may be further countered by providing the lower part of header 10 and section 18 forming the supply T union with fins for increasing heat transfer. The fins may be evenly spaced apart hoops 40 (FIGS. 7 and 9) or longitudinal flat portions 42 welded along generatrices, at the lower part of the T. Since the fins increase heat exchanges at the lower part of the header, they tend to reduce the temperature difference between the cold and the hot layers.

Figure 11:
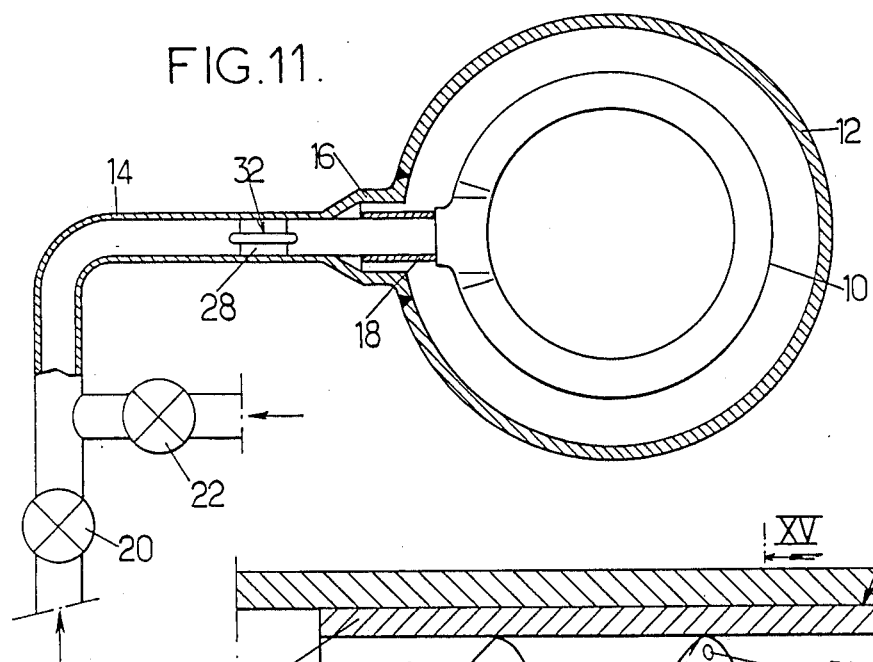

Referring to FIG. 11, the header 10 of a heat exchanger according to another embodiment of the invention comprises one deflector 32 only. That deflector is located in the horizontal pipe section 14 which is immediately out of the vessel 12. The deflector is intended to provide flow mixing and for countering thermal stratification at least.

Figure 12:
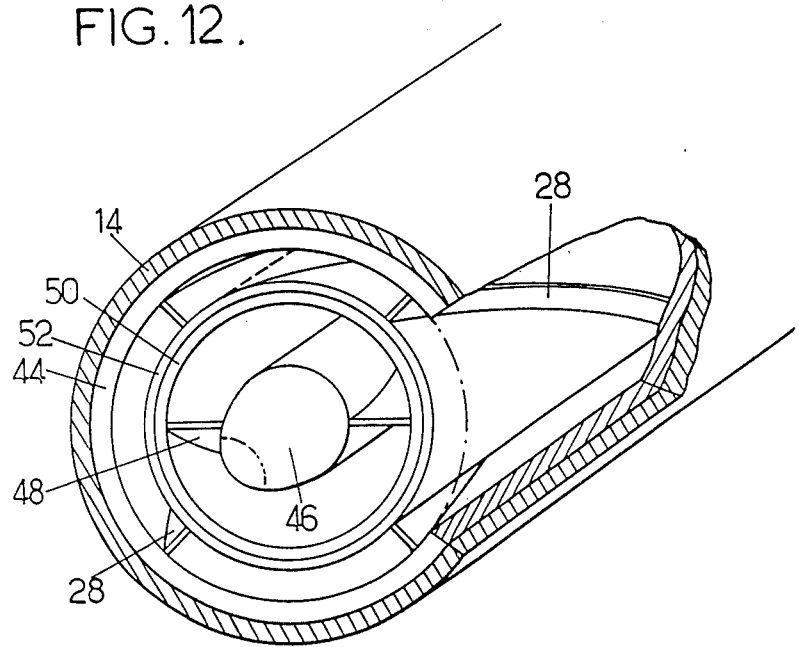
Figure 13:
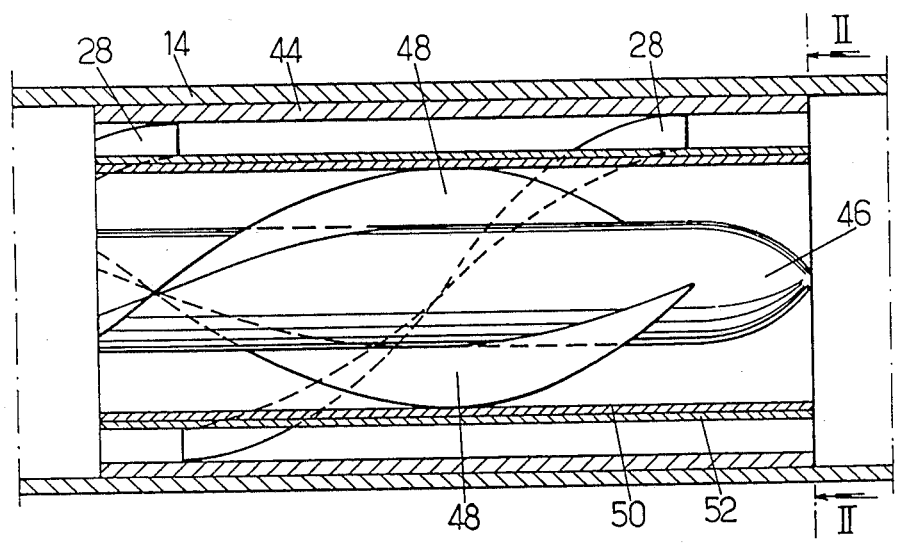

As shown in FIGS. 12 and 13, the deflector has an external sleeve 44 which may be constructed for thermal protection. The outer diameter of sleeve 44 may be shaped for the sleeve to have a sliding fit in pipe 14, for easier insertion of the deflector into the pipe. A leak-tight connection may then be provided.

The deflector has a central hub 46 and a plurality of helical blades or fins 48 evenly distributed about the hub, secured to the hub and to an annular partition 50. That partition is received in a sleeve 52 and a set of a plurality of helical vanes or fins 28 are located between and securely connected to sleeves 52 and 44.

While each vane or fin 28 is of helical shape along the greater part of its development, it may have a front and/or a rear end portions for transition between an axial flow and a helical flow. In such portions, each fin progressively takes a longitudinal direction.

Each fin has at least half a turn. For unpriming the siphon constituted by the interblade channels, passages for communicating adjacent interblade channels may be formed, at least in that blade which has a portion at the top of sleeve 44. Such passages may consist of a hole (not shown). If the angular extent of the fins exceeds one turn, the passage will typically be located at that highest point which is most downstream.

As shown, the hub 46 is cylindrical with a streamlined front part for reducing the head loss. The fins 48 are at least two in number and their junctions with hub 46 and annular partition 50 should be leaktight for avoiding air or steam flow. By providing a sleeve 52 distinct from annular partition 50, the deflector is easier to manufacture. Two sub-assemblies consisting of sleeve 44, fins 48 and sleeve 52 and of the internal portion may be separately manufactured, the slid into each other. Final connection may be made by annular rolling. However, other conventional types of connection, for instance by welding, may be used.

When the deflector is for countering thermal stratification only, the fins 28 and 48 may have an angular development as low as half a turn. The peripheral fins 28 trap the cold water layer and lift if close to the higher portion of the pipe. They consequently complete the effect of the fins 48, which are two in number at least and which cannot lift cold water beyond the higher line of hub 46 when the cold water layer is shallow.

The fins 48 may be wound in a direction opposite to that of fins 28.

When the deflector is for attenuating pressures surges, the fins 28 and 48 should have a length corresponding to at least one turn, preferably 1.5 turn.

As fins 28, the fins 48 may have end portions which straighten the flow. However, if a second deflector with helical fins having the same direction of winding as fins 28 and 48 is located in the pipe, downstream of that of FIGS. 12 and 13, there is no need for a longitudinal end portion of the fins 28 and 48.

The fins 48 are arranged for impressing a head loss to the water flow along the annular space between hub 46 and annular partition 50 higher than that due to the fins 28, for increasing cold water flow along fins 28.

Figure 14:
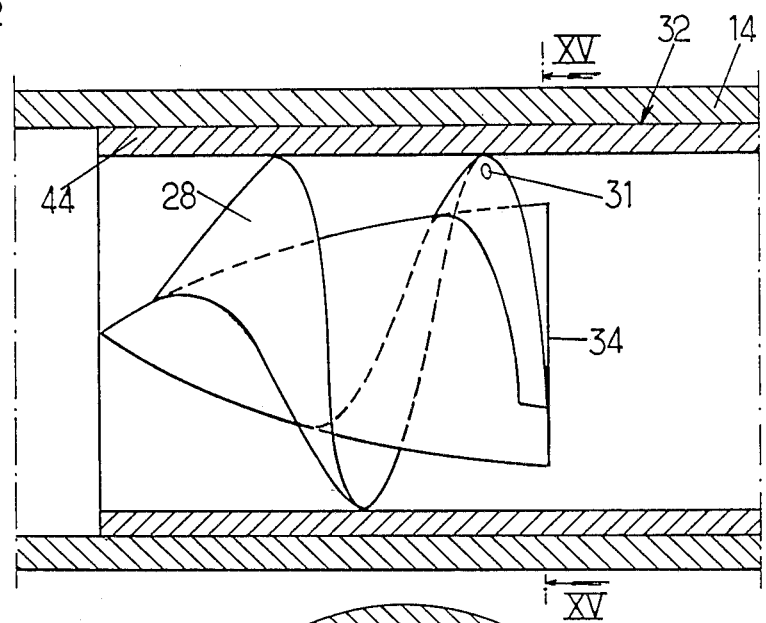
Figure 15:
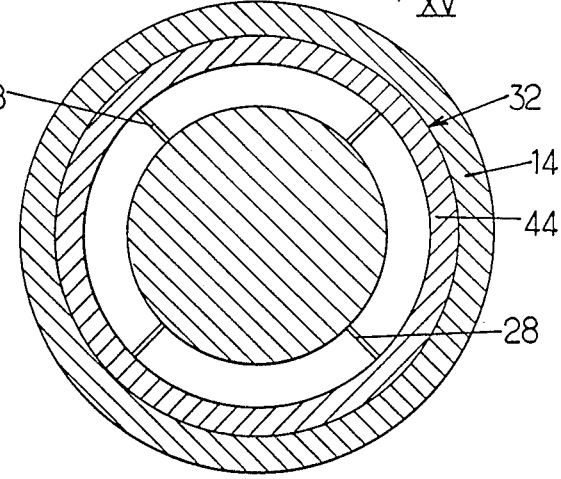

Referring to FIGS. 14 and 15, a deflector according to another embodiment has a solid bullet shape hub 34. Hub 34 is connected by four evenly distributed fins 28 (one only of which is shown in FIG. 14) to a sleeve 44. Again, the deflector lifts the cold water layer toward the higher portion of sleeve 44, thereby causing mixing to occur behind the deflector. The progressive increase in the flow section of the hub decreases the cross-sectional flow area and increases the speed and consequently mixing. In that embodiment, the maximum diameter of hub 334 may exceed 0.5 times the diameter of the pipe.

When a deflector as shown in FIGS. 14 and 15 is for countering thermal stratification only, two fins 28 each covering half a turn are enough. However, three or four fins will typically be used. When the deflector is for countering pressure surges only, a device having at least two fins, each covering at least one turn, will be used. Last, a device having four fins of at least one turn (and preferably 1.5 turn) will be used for countering both phenomena.

Sleeve 44 may be constructed by winding a band as a spiral, then mutually welding adjacent turns.

Figure 16:
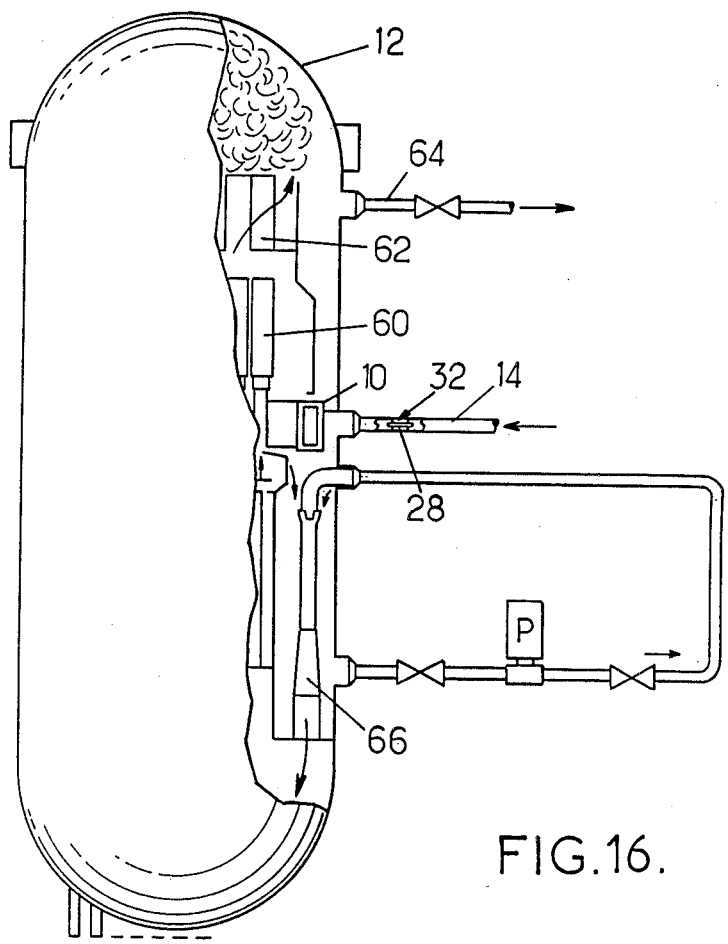

When the heat exchanger consists of a boiling water reactor, as shown in FIG. 16, a deflector (or two successive deflectors) 32 is located on the feed water pipe 14, just before the feed water inlet nozzle. The BWR again has a feed water header 10 located under the steam separators 60 and the steam dryiers 62. The dried steam flows out of the reactor vessel 12 via a steam outlet nozzle and a steam pipe 64. Water flow inside the reactor is achieved by conventional loops, one of which only is schematically shown. Ejectors 66 or circulation pumps may be used in the loop.

The invention is not limited to the particular embodiments which have been shown and described by way of examples only.

What is claimed is:

1. Steam generator for a nuclear power plant comprising a pressure vessel; elongated exchange elements in said vessel; a steam plenum at the upper part of said vessel; a feedwater header located within said vessel above said elongated exchange elements and having passages for the flow of feed water into the vessel; and a feed water intake pipe passing through the wall of the vessel, wherein said pipe contains, in a horizontal portion thereof, at least one deflector comprising an axial hub and a plurality of helical blades connecting the hub to the wall of the pipe and whose length represents at least one half of a winding pitch.

2. Generator according to claim 1, further having communication means between the helical flow channels defined by the blades, opening at the top part of one channel at least.

3. Generator according to claim 1, wherein the deflector is situated in the pipe between the header and the location where the pipe projects through the vessel.

4. Generator according to claim 3, wherein said deflector comprises at least four evenly spaced apart blades, having an angular development of from one turn to one turn and a half.

5. Generator according to claim 4, wherein said pipe contains a second deflector placed upstream of the first named deflector and of the vessel, said second deflector comprising a hub and a plurality of helical blades at the same pitch as the blades of the first named deflector.

6. Generator according to claim 5, wherein the blades of the second deflector have an angular extent development of approximately half a turn and said second deflector comprises four blades.

7. Generator according to claim 1, wherein the blades of the single deflector or the second deflector have a longitudinally directed front portion.

8. Generator according to claim 1, wherein the blades of the first named deflector have a rear portion with longitudinally radially extending lips.

9. Generator according to claim 1, wherein said helical blades are connected to annular partition means at the outer periphery thereof and a set of evenly distributed helical vanes are located between said pipe and said annular partition means.

10. Generator according to claim 9, wherein said vanes are arranged to impart a lower head loss to said flow than said blades.

11. Generator according to claim 1, wherein said hub is cylindrical along the greater portion of its length with a diameter of from 0.25 to 0.5 times the inside diameter of said pipe.

* * * * *